United States Patent Office 3,002,036
Patented Sept. 26, 1961

3,002,036
PROCESS FOR PREPARING AROMATIC HYDROCARBONS
Ernst Hieronymus, Frankfurt am Main, Germany, assignor to Farbwerke Hoechst Aktiengesellschaft vormals Meister Lucius & Brüning, Frankfurt am Main, Germany, a corporation of Germany
No Drawing. Filed May 10, 1957, Ser. No. 658,222
Claims priority, application Germany May 16, 1956
15 Claims. (Cl. 260—673.5)

The present invention relates to a process for preparing aromatic hydrocarbons.

It has already been proposed to prepare aromatic hydrocarbons from 2.2.4-trimethylpentane and 2.4.4 - trimethylpentenes by passing these hydrocarbons at a raised temperature in the presence or absence of a carrier gas over a solid catalyst. In this process is it especially suitable to use hydrogen and/or isobutylene as a carrier gas. Thus, for example 2.2.4-trimethylpentane and/or 2.4.4-trimethylpentene-1 and/or 2.4.4-trimethylpentene-2 may be converted to paraxylene. In the aforesaid processes para-xylene is obtained in a proportion of about 10–20% by weight calculated upon the resulting liquid products which corresponds to a yield of about 8–15% in one passage calculated upon the starting material used.

If aromatic hydrocarbons are produced in the presence of a carrier gas, the work up can be considerably simplified using benzene or a homologous hydrocarbon, that is an alkyl-substituted hydrocarbon, as diluent instead of the aforesaid carrier gases.

Now I have found that aromatic hydrocarbons can be obtained from aliphatic, saturated or olefinic hydrocarbons containing at least 6 carbon atoms by aromatizing these hydrocarbons in the vaporous state at a temperature within the range of 450–650° C. in the presence of known aromatization catalysts and in the presence of benzene and/or the homologs thereof as diluents. These substances must be fairly stable under the reaction conditions applied, are not allowed to react either with the starting material or the final products obtained, and must have a boiling point so that no difficulty arises in the work up of the reaction products by distillation. These requirements are very satisfactorily met by benzene.

In using as diluents the substances of this invention, especially benzene, it has been found that, as compared with comparable experiments made with the use of hydrogen or a hydrocarbon containing 1–4 carbon atoms as carrier gas, the proportion of cracked products useless for the reaction is reduced in favor of the yield, this being surprising.

As diluent there may be used especially benzene, but also the homologs thereof, such as toluene, para-xylene, ethyl benzene, pseudo-cumene, propyl benzene, cumene, cymene or butyl benzene as far as these compounds meet the aforesaid requirements. Among the homologs there may be used especially those aromatic hydrocarbons containing only methyl- and/or tertiary butyl groups. In many cases it is advantageous to use as diluting agent that substance which is to be prepared in the aromatization reaction. In the case where benzene is prepared there may be used as diluent pure benzene and also a part of the crude reaction product. If benzene is used as a carrier gas for the production of para-xylene, it may be caused to crystallize from the liquid product together with para-xylene by cooling. The crystallized substance is then subjected to a distillation to yield pure para-xylene and pure benzene.

The process of this invention is especially useful for the manufacture of para-xylene which is of considerable commercial interest. Also in this case it is possible to use para-xylene or a part of the reaction mixture—for example without previous fractionation or a simple distillation—as diluting medium. The unchanged starting material retained in the reaction product is then aromatized and para-xylene can be separated in an especially simple manner as a result of its high concentration from that part of the reaction product which is not used again.

By the process of this invention the manufacture of aromatic hydrocarbons has been considerably improved independent of the charge per volume and time applied. It is especially advantageous to operate with a charge per volume and time of 0.4–0.9 l. of liquid hydrocarbon to be cracked per liter of contact space and hour. It is also preferred to dilute at least 1 mol, preferably 2–4 mols of the hydrocarbon used.

The reaction of this invention may be carried out at a temperature within the range of 450–650° C., preferably within the range of 520–590° C. in the presence of a known aromatization catalyst. As catalysts of this type there may be used products consisting of metal oxides of group VI of the periodic table and/or mixed compounds and/or mixtures of these oxides with one another or with oxides of titanium, zirconium, thorium or vanadium, if desired in the presence of platinum or palladium metal, with or without oxides of group III of the periodic table as carriers, and with or without oxides of the alkali metals or alkaline earth metals and/or oxides of the group of the rare earths as activator.

As catalysts there may be used chromium oxide/aluminum oxide catalysts, and more especially chromium oxide/potassium oxide/cerium oxide/gamma-aluminum oxide catalysts, in which the ratio of chromium oxide/potassium oxide/cerium oxide/gamma-aluminum oxide may vary within the limits of

5–40/1–10/0.5–5/93.5–45%

It is however preferred to use a catalyst in which the individual components appear in a proportion of 12.1/1.7/1.5/84.7

There may also be used catalysts which consist of chromium oxide/aluminum oxide and platinum or palladium metal. There may be used for example the catalysts described in Patent Number 2,785,209. The yield in aromatic hydrocarbons depends also on the temperature and the time of action of catalyst.

The degree of aromatization increases as the temperature increases. The incraesing temperature goes parallel with an increased splitting, so that less starting material is recovered whereby the yield as compared with an operation at a lower temperature is reduced.

The time of action of catalyst influences the reaction like the temperature. If the time of dwell of the substance vapor in the contact space is increased at a constant temperature, both the degree of aromatization and splitting is increased. Splitting increases preponderantly so that the yield of aromatic hydrocarbons in the liquid product is reduced. By increasing the temperature and reducing the time of stay in a manner such that both factors compensate one another with respect to splitting, there is brought about an improved degree of aromatization. The contact time during which is cyclization, isomerization and aromatization take place by dehydrogenation, cannot be shortened at will, since with too strong a shortening dehydrogenation does not proceed far enough. The reaction of this invention may therefore be carried out at temperatures within the range of 450–650° C. and contact times within 0.1–60 seconds, a contact time of 1–12 seconds being preferred.

As has further been found it is important that the aromatization be carried out with complete exclusion of moisture. If the operation is carried out for example with the use of a moved catalyst which, after having passed the reactor, is allowed to travel successively through a regenerator charged with air, and a reducing zone charged with hydrogen or another reducing gas, the catalyst adsorbs part of the water formed so that the aromatizing activity decreases rapidly.

In order to free the catalyst from the adhering water vapor, it is therefore suitable to dry said catalyst prior to the reaction by passing it through a rinsing gas (for example nitrogen). It is also suitable previously to dry the starting material and the diluent. The starting mixture should not contain more than 0.05% by volume of water.

As starting materials there may be used saturated or olefinic hydrocarbons containing at least 6 carbon atoms and preferably not more than 16 carbon atoms, for example hexane, heptane, octane, decane or dodecane; there may be used normal hydrocarbons and the branched hydrocarbons, such as triisobutene or tetrapropylene. For the manufacture of para-xylene it is especially suitable to use as starting material diisobutylene, triisobutylene, the hydrogenation products thereof or also mixtures thereof:

The following examples serve to illustrate the invention, but they are not intended to limit it thereto:

*Example 1*

A mixture of 51.4 g./h. of diisobutylene and 105 g./h. of benzene was passed at 550° C. over 100 cc. of a catalyst which was prepared in known manner by impregnating gamma-aluminum oxide with a solution of chromic acid, potassium nitrate and cerium nitrate, then calcined for 5 hours at 550° C. and reduced in a current of hydrogen and which contained 14.7% of chromium, 1.73% of potassium and 0.46% of cerium. In the course of 1 hour there were obtained in one passage 137.9 g. of a liquid product containing 17 g. of para-xylene corresponding to 35% of the theory calculated upon the diisobutylene used.

The liquid product so prepared contained 98% of the benzene used in addition to small amounts of toluene, ortho-xylene and meta-xylene. The rest substantially consisted of diisobutylene. Benzene and diisobutylene may be used again. The same applies to the toluene formed during the reaction thereby partially balancing the loss of benzene. The separation of carbon on the catalyst was less than 0.5% calculated upon the diisobutylene used.

*Example 2*

A mixture of 51.4 g./h. of diisobutylene and 124 g./h. of toluene was passed at 550° C. over 100 cc. of the catalyst of Example 1. After 1 hour, 152 g. of a liquid product were obtained of which 16.5 g. were para-xylene corresponding to 33.9% of the theory calculated upon the diisobutylene used.

I claim:

1. A process for the manufacture of p-xylene which comprises aromatizing a compound of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range of 450° C. to 650° C. and in the presence initially of at least one mol of mononuclear aromatic hydrocarbon per mol of said aliphatic hydrocarbon.

2. A process for the manufacture of p-xylene which comprises aromatizing a mixture of diisobutylene and triisobutylene in the presence of a solid aromatization catalyst comprising at least one oxide of a metal of the group consisting of chromium, molybdenum and tungsten at a temperature in the range from 450° C. to 650° C. and in the presence initially of at least one mol of mononuclear aromatic hydrocarbon per mol of said aliphatic hydrocarbon.

3. A process for the manufacture of p-xylene which comprises aromatizing an alpihatic hydrocarbon of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range from 450° C. to 650° C. and in the presence initially of two to four mols of at least one mononuclear aromatic hydrocarbon per mol of said aliphatic hydrocarbon.

4. A process for the manufacture of p-xylene which comprises aromatizing an aliphatic hydrocarbon of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range from 520° C. to 590° C. and in the presence initially of at least one mol of mononuclear aromatic hydrocarbon per mol of said aliphatic hydrocarbon.

5. A process for the manufacture of p-xylene which comprises aromatizing an aliphatic hydrocarbon of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range from 450° C. to 650° C. and in the presence initially of at least one mol of benzene per mol of said aliphatic hydrocarbon.

6. A process as defined in claim 1 wherein a mononuclear aromatic hydrocarbon is used which contains at most two substituents of the group consisting of methyl radicals, tertiary butyl radicals and methyl- and tertiary butyl radicals.

7. A process for the manufacture of p-xylene which comprises aromatizing an aliphatic hydrocarbon of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range from 450° C. to 650° C. and in the presence initially of at least one mol of mononuclear aromatic hydrocarbon per mol of said aliphatic hydrocarbon, the vaporous mixture of said aliphatic hydrocarbon and of said mononuclear hydrocarbon containing less than 0.05% by volume of water vapor.

8. A process for the manufacture of p-xylene which comprises aromatizing an aliphatic hydrocarbon of the group consisting of diisobutylene, triisobutylene, hydrogenation products thereof and mixtures thereof in the presence of a solid aromatization catalyst comprising at least one oxide of a metal of the group consisting of chromium, molybdenum and tungsten at a temperature in the range from 450° C. to 650° C. at a charge per volume and time of 0.4 to 0.9 liters, measured as liquid hydrocarbon, of the hydrocarbon to be aromatized per liter of contact space and hour and in the presence initially of at least one mol of mononuclear aromatic hydrocarbon per mol of said aliphatic hydrocarbon.

9. A process for the manufacture of p-xylene which comprises aromatizing an aliphatic hydrocarbon of the group consisting of diisobutylene, triisobutylene, hydrogenation products thereof and mixtures thereof in the presence of a solid aromatization catalyst consisting of 5 to 40% of chromium oxide, 0.5 to 5% of cerium oxide, 1 to 10% of potassium oxide and 93.5 to 45% of aluminum oxide at a temperature in the range from 450° C. to 650° C. and in the presence initially of at least one mol of mononuclear aromatic hydrocarbon per mol of said aliphatic hydrocarbon.

10. A process for the manufacture of p-xylene which comprises aromatizing an aliphatic hydrocarbon of the group consisting of diisobutylene, triisobutylene, and mixtures thereof in the presence of a solid aromatization catalyst consisting of 5 to 40% of chromium oxide, 0.5 to 5% of cerium oxide, 1 to 10% of potassium oxide and 93.5 to 45% of aluminum oxide at a temperature in the range from 450° C. to 650° C. at a charge per volume and time of 0.4 to 0.9 liters of liquid hydrocarbon per liter of contact space and hour, and in the presence initially of at least on mol of a mononuclear aromatic hydrocarbon per mol of the hydrocarbon to be aromatized, the vaporous mixture of the aliphatic hydrocarbon to be aromatized and of said mononuclear aromatic hydrocarbon containing less than 0.05% by volume of water vapor and recovering p-xylene.

11. In a method of aromatizing diisobutylene to p-xylene by passing vapors thereof over an aromatization catalyst comprising at least on oxide of a metal of the group consisting of chromium, molybdenum and tungsten at a temperature in the range from 450° C. to 650° C., the improvement which comprises admixing with said diisobutylene vapors, prior to their passage over said catalyst, at least one mol of a vaporized mononuclear aromatic hydrocarbon per mol of diisobutylene.

12. Method as defined in claim 11 wherein the mononuclear hydrocarbon is one containing up to two substituents of the group consisting of methyl and tertiary butyl groups.

13. Method as defined in claim 11 wherein the mononuclear aromatic hydrocarbon is benzene.

14. Method as defined in claim 11 wherein the mononuclear hydrocarbon is toluene.

15. In a method a aromatizing a vaporizable aliphatic hydrocarbon of the group consisting of diisobutylene, triisobutylene, hydrogenation products thereof and mixtures thereof to p-xylene by passing vapors of said aliphatic hydrocarbon over an aromatization catalyst comprising at least one oxide of a metal of the group consisting of chromium, molybdenum and tungsten at a temperature in the range from 450° C. to 650° C., the improvement which comprises admixing with said aliphatic hydrocarbon vapors, prior to their passage over said catalyst, at least one mol of a vaporized mononuclear aromatic hydrocarbon per mol of said aliphatic hydrocarbon.

References Cited in the file of this patent

UNITED STATES PATENTS 2,337,190     Greensfelder at al. _____ Dec. 21, 1943
2,785,209     Schmetterling et al. _____ Mar. 12, 1957